US012659708B2

(12) United States Patent
Siswick et al.

(10) Patent No.: US 12,659,708 B2
(45) Date of Patent: Jun. 16, 2026

(54) COMMUNICATION SYSTEM AND METHOD

(71) Applicant: JAGUAR LAND ROVER LIMITED, Whitley (GB)

(72) Inventors: Howard Siswick, Whitley (GB); Mohammed Khan, Whitley (GB); David Waddell, Whitley (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 343 days.

(21) Appl. No.: 18/263,071

(22) PCT Filed: Feb. 3, 2022

(86) PCT No.: PCT/EP2022/052625
§ 371 (c)(1),
(2) Date: Jul. 26, 2023

(87) PCT Pub. No.: WO2022/167545
PCT Pub. Date: Aug. 11, 2022

(65) Prior Publication Data
US 2024/0107281 A1 Mar. 28, 2024

(30) Foreign Application Priority Data
Feb. 5, 2021 (GB) ..................................... 2101632

(51) Int. Cl.
*H04W 4/48* (2018.01)
*H04W 76/10* (2018.01)
*H04W 84/20* (2009.01)

(52) U.S. Cl.
CPC ............. *H04W 4/48* (2018.02); *H04W 76/10* (2018.02); *H04W 84/20* (2013.01)

(58) Field of Classification Search
CPC ........ H04W 4/48; H04W 76/10; H04W 84/20
See application file for complete search history.

(56) References Cited

U.S. PATENT DOCUMENTS

| | | | |
|---|---|---|---|
| 6,611,201 B1 * | 8/2003 | Bishop .................... | B60R 25/04 |
| | | | 340/426.21 |
| 10,356,093 B2 * | 7/2019 | Yamamoto ............ | H04W 76/14 |
| 2015/0181586 A1 | 6/2015 | Kwon et al. | |

FOREIGN PATENT DOCUMENTS

| | | |
|---|---|---|
| EP | 3400534 B1 | 8/2020 |
| FR | 3097709 A1 | 12/2020 |
| KR | 101076494 B1 | 10/2011 |

OTHER PUBLICATIONS

European Patent Office, Office Action Issued in Application No. 22707036.0, Dec. 7, 2023, Germany, 4 pages.

(Continued)

*Primary Examiner* — Tuan H Nguyen
(74) *Attorney, Agent, or Firm* — McCoy Russell LLP

(57) ABSTRACT

A communication system for intra-vehicle communication in a host vehicle includes a master control system including a master controller and a master transceiver, the master control system being configured to receive an input signal to control an on-board vehicle system. The communication system has a slave control system associated with the on-board vehicle system, the slave control system comprising a slave controller and a slave transceiver. The master transceiver and the slave transceiver are configured to establish wireless communication between the master control system and the slave control system. The master control system is configured to receive the input signal and to generate an output signal based on the input signal; and to transmit the output signal to the slave control system to control operation of the on-board vehicle system.

16 Claims, 5 Drawing Sheets

(56)               References Cited

OTHER PUBLICATIONS

Great Britain Intellectual Property Office, Combined Search and Examination Report under Section 17 and 18(3) Issued in Application No. GB2101632.4, Oct. 19, 2021, 8 pages.
ISA European Patent Office, International Search Report and Written Opinion Issued in Application No. PCT/EP2022/052625, Jun. 1, 2022, WIPO, 8 pages.

* cited by examiner

COMMUNICATION SYSTEM AND METHOD

CROSS REFERENCE TO RELATED APPLICATIONS

The present application is a U.S. National Phase of International Application No. PCT/EP2022/052625 entitled "COMMUNICATION SYSTEM AND METHOD," and filed on Feb. 3, 2022. International Application No. PCT/EP2022/052625 claims priority to Great Britain Patent Application No. 2101632.4 filed on Feb. 5, 2021. The entire contents of each of the above-listed applications are hereby incorporated by reference for all purposes.

TECHNICAL FIELD

The present disclosure relates to a communication system and method. More particularly, but not exclusively, the present disclosure relates to a communication system and method for intra-vehicle communication. Aspects of the invention relate to a communication system, a master control system, a slave control system, a vehicle, a method and a non-transitory computer-readable medium.

BACKGROUND

It is known to provide an electrical harness (wiring loom) in a road vehicle, such as an automobile, to control operation of on-board vehicle systems. Increasingly complex electrical harnesses are required to enable control of the wide range of systems present in modern vehicles. It is expected that this problem will be exacerbated by the increasing electrical signals required within modern vehicles. It would be desirable to reduce the complexity of the electrical harness installed in the vehicle. The use of serial communication buses, such as CAN and LIN, help to reduce complexity of the electrical harnesses in vehicles.

However, these serial communication buses often utilise twisted pair cabling which is expensive. Moreover, a fault or breakage in the serial communication bus may result in multiple system failures due to the arrangement whereby systems are daisy-chained together and are reliant on a single bus.

It is an aim of the present invention to address one or more of the disadvantages associated with the prior art.

SUMMARY OF THE INVENTION

Aspects and embodiments of the invention provide a communication system, a master control system, a slave control system, a vehicle, a method and a non-transitory computer-readable medium as claimed in the appended claims.

According to an aspect of the present invention there is provided a communication system for intra-vehicle communication in a host vehicle, the communication system comprising:

a master control system comprising one or more master controller and a master transceiver, the master control system being configured to receive a first input signal to control a first on-board vehicle system; and a first slave control system associated with the first on-board vehicle system, the first slave control system comprising one or more first slave controller and a first slave transceiver;

the master transceiver and the first slave transceiver being configured to establish wireless communication between the master control system and the first slave control system;

wherein, in use, the master control system is configured to receive the first input signal and to generate a first output signal in dependence on the first input signal; and to transmit the first output signal to the first slave control system to control operation of the first on-board vehicle system. The master control system and the slave control system are in wireless communication with each other. The first output signal is transmitted to the slave control system as a wireless signal, thereby reducing the extent or complexity of wired connections in the vehicles. This may simplify a wiring loom in the vehicle as wired connections may be reduced to provide control instructions to the vehicle systems.

The first slave control system may be configured to be connected to a power source and an electrical ground. The first slave control system may have one or more electrical connection, the one or more electrical connection may comprise or consist of a power connection and a ground connection. This arrangement may be replicated for a plurality of the slave control systems. The wired connection to each slave control system may be simplified compared to prior art systems as it is not necessary to provide a communication channel to the or each slave control system.

The first slave control system may be electrically connected to the first on-board vehicle system, for example in a piggy-back arrangement. The first slave control system and the first vehicle system may have complementary electrical connectors, for example complementary ports. This arrangement may help to reduce the complexity of the electrical harness and may facilitate assembly.

In a variant, the first slave control system may be combined with the first vehicle system. For example, the first slave control system may be integrated with a local control module for controlling the first vehicle system. The local control module may comprise one or more switch, for example in the form of a switch pack. The first slave control system may be integrated into the switch pack. Each switch may comprise an electromechanical switch for controlling the vehicle system.

The first slave transceiver provides a first transceiver node for communication with the master transceiver. It will be understood that more than one slave control system may be provided in the vehicle. Each slave transceiver may provide a separate transceiver node.

At least in certain embodiments, the communication system enables intra-vehicle communications between the master control system and at least the first slave communication system. At least in certain embodiments, communication may be established between two or more of the slave communication systems.

The one or more master controller may comprise at least one master electrical processor having an electrical input for receiving the first input signal. At least one memory device may be electrically coupled to the at least one master electrical processor and having instructions stored therein. The at least one master electrical processor may be configured to access the at least one memory device and execute the instructions therein so as to generate the first output signal for transmission to the first slave control system.

The first slave controller may comprise at least one first slave electrical processor having an electrical input for receiving the first output signal. At least one memory device may be electrically coupled to the at least one first slave electrical processor and having instructions stored therein. The at least one first slave electrical processor may be configured to access the at least one memory device and execute the instructions therein so as to generate a vehicle system control signal to control operation of the first slave control system.

The first on-board vehicle system may comprise a primary (principal) vehicle system for controlling dynamic operation of the vehicle. The first on-board vehicle system may be in the form of a secondary (subsidiary) vehicle system for controlling operation of one or more ancillary systems. The first on-board vehicle system may, for example, comprise one or more of the following non-exhaustive list: an adjustment mechanism for a side (wing) mirror; a rear-view mirror; a lock mechanism, for example for locking a door or tailgate; a handle retraction mechanism, for example to retract a door handle; one or more interior light; one or more exterior light; and an infotainment system. Other secondary vehicle systems are also contemplated.

The master control system may be configured to receive the first input signal from a human machine interface. Alternatively, or in addition, the master control system may be configured to receive the first input signal from a vehicle controller.

The first output signal may comprise a first identifier for identifying the first slave control system. The first identifier may, for example, comprise an identification code. Alternatively, or in addition, the first identifier may identify the vehicle control system to be controlled.

The communication system may comprise a plurality of slave control systems. The slave control systems may form a plurality of communication nodes in the vehicle. The slave control systems may have like configurations. Each slave control system may have a unique identifier, for example in the form of an identification code.

The communication system may comprise a second slave control system associated with a second on-board vehicle system. The second slave control system being configured to control operation of the second on-board vehicle system. The second slave control system may comprise one or more second slave controller and a second slave transceiver. In use, the master control system may be configured to receive a second input signal and to generate a second output signal in dependence on the second input signal. The second master control system may transmit the second output signal to the second slave control system to control operation of the second on-board vehicle system.

The second slave controller may comprise at least one second slave electrical processor having an electrical input for receiving the second output signal. At least one memory device may be electrically coupled to the at least one second slave electrical processor and having instructions stored therein. The at least one second slave electrical processor may be configured to access the at least one memory device and execute the instructions therein so as to generate a vehicle system control signal to control operation of the second slave control system.

The master transceiver and the second slave system transceiver may be configured to establish wireless communication between the master control system and the second slave control system. This may enable direct communication between the master control system and the slave control system.

The first slave transceiver and the second slave transceiver may be configured to establish wireless communication between the first slave control system and the second slave control system. At least in certain embodiments, inter-nodal communication may be performed between two or more slave control systems. The slave control systems may be daisy-chained together, for example to enable serial communication between a plurality of the slave control systems. This may facilitate operation of a wider range. For example, this may enable communication with one or more slave control systems disposed in a trailer or a caravan hitched to the host vehicle.

The second slave control system may comprise a second identifier for identifying the second slave control system. The master control system may be configured to receive a second input signal to control the second on-board vehicle system. The second control signal may comprise the second identifier to identify the second slave control system.

The master transceiver and the slave transceiver are configured to communicate with each other. The master transceiver may comprise an ultra-wideband (UWB) transceiver. The slave transceiver may comprise an ultra-wideband transceiver. The use of ultra-wideband transceivers may help to reduce interference between the master transceiver and the slave transceiver. This may be useful when a plurality of the transceivers are disposed in close proximity to each other in the vehicle.

The ultra-wideband transceiver may be configured to operate over a bandwidth greater than or equal to 500 MHz. The ultra-wideband transceiver enable high data rate transfer. This may facilitate more complex signalling between the master control system and the slave control system to exchange data. At least in certain embodiments, communication is not limited to a switching operation to activate and deactivate a vehicle system.

Two-way communication may be enabled between the master control system and the slave control system. This may enable progressive control of the vehicle signal. The slave control system may transmit status information to the master control system. The slave control signal may transmit feedback to the master control system, for example to enable closed loop control of the associated vehicle system.

The master control system may comprise a master encoder/decoder module. The slave control system may comprise a slave encoder/decoder module. The master and slave encoder/decoder modules may enable transmission of more complex data between the master control system and the slave control system.

According to a further aspect of the present invention there is provided a master control system for communicating with one or more slave control system in a host vehicle, the master control system comprising one or more master controller and a master transceiver, the master control system being configured to receive a first input signal to control a first on-board vehicle system;

the master control system being configured to receive the first input signal and to generate a first output signal in dependence on the first input signal; and the master transceiver being configured to transmit the first output signal as a wireless signal to the one or more slave control system to control operation of an on-board vehicle system.

According to a further aspect of the present invention there is provided a slave control system for communication with a master control system in a host vehicle, the slave control system comprising:

a slave control system for controlling an on-board vehicle system, the first slave control system comprising one or more slave controller and a slave transceiver;

the slave transceiver being configured to receive a first output signal transmitted by a master control system as a wireless signal; and the slave control system being configured to receive the first output signal and to output a first control signal for controlling operation of the first on-board vehicle system.

According to a further aspect of the present invention there is provided a communication system to identify one or more slave control systems in dependence on their location in a host vehicle. The communication system comprises a master control system for communicating with the one or more slave control systems. The master control system being configured to identify the one or more slave control systems in the vehicle and to determine a location of the or each slave control system. The master control system may associate the or each slave control system with a respective vehicle system in dependence on the determined location of that slave control system in the vehicle. The master control system may be configured to control the one or more vehicle system in dependence on the determined association. The master control system may utilise multilateral positioning to determine the position of the one or more slave control system, for example with reference to a reference position the vehicle. The association between the or each salve control system and the vehicle system may be established with referenced to one or more predefined location on the vehicle. Each predefined location may have a predetermined association with one of the vehicle systems. If the determined location of a slave control system corresponds to one of the predefined locations, the predetermined association for that location may be allocated to that slave control system. The location of the slave control system may be determined in two-dimensional or three-dimensional space.

According to a further aspect of the present invention there is provided a vehicle comprising a communication system as described herein.

According to a further aspect of the present invention there is provided a method of performing intra-vehicle communication a master control system and at least a first slave vehicle system disposed in a host vehicle, the method comprising:

the master control system receiving a first input signal comprising a request to control a first on-board vehicle system;

the master control system generating a first output signal in dependence on the first input signal;

transmitting the first output signal from the master control system to the first slave vehicle system as a wireless signal; and the first slave control system controlling operation of the first on-board vehicle system in dependence on the first output signal.

The first input signal may be received from a human machine interface or a vehicle controller.

The first output signal may comprise a first identifier for identifying the first slave control system.

The method may comprise:

the master control system receiving a second input signal comprising a request to control a second on-board vehicle system;

the master control system generating a second output signal in dependence on the second input signal;

transmitting the second output signal from the master control system to the second slave vehicle system as a wireless signal;

the second slave control system controlling operation of the second on-board vehicle system in dependence on the second output signal.

The second output signal may comprise a second identifier for identifying the second slave control system.

According to a further aspect of the present invention there is provided a method of identifying one or more slave control systems in dependence on their location in a host vehicle. The method comprises identifying the or each slave control system; and determining determine a location of the or each slave control system. The method comprises associating the or each slave control system with a respective vehicle system in dependence on the determined location of that slave control system in the vehicle. The method may comprise controlling the one or more vehicle system in dependence on the determined association.

According to a further aspect of the present invention there is provided a non-transitory computer-readable medium having a set of instructions stored therein which, when executed, cause a processor to perform the method described herein.

Any control unit or controller described herein may suitably comprise a computational device having one or more electronic processors. The system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller or control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. The control unit or controller may be implemented in software run on one or more processors. One or more other control unit or controller may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

A communication system 1 for controlling one or more on-board vehicle systems 2-$n$ in accordance with an embodiment of the present invention will now be described with reference to the accompanying figures.

Figure 1:
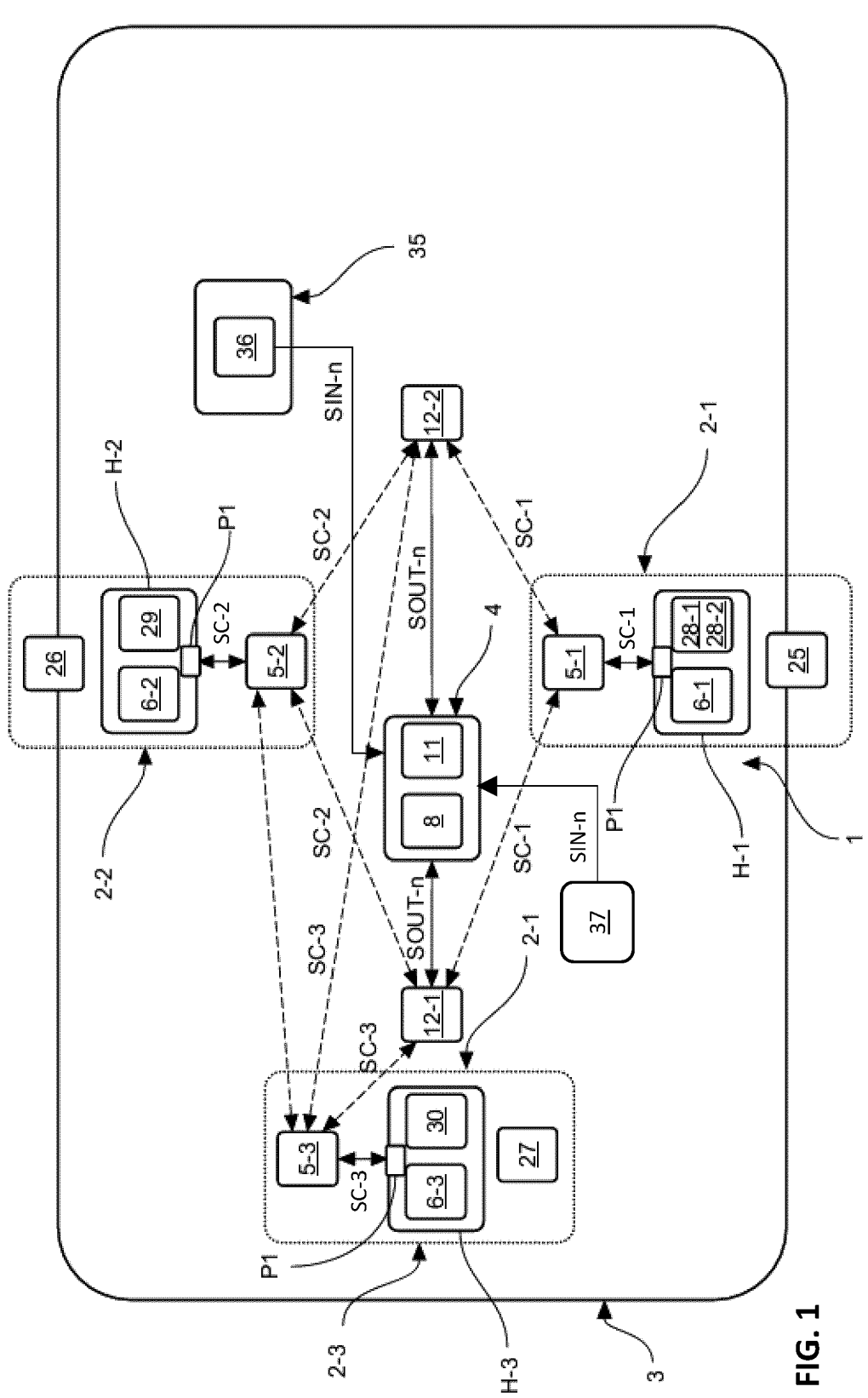
FIG. 1 shows a schematic representation of a vehicle incorporating a communication system in accordance with an embodiment of the present invention.

As shown in FIG. 1, the communication system 1 is implemented in a vehicle 3. The communication system 1 in the present embodiment is configured to control operation of a plurality of the vehicle systems 2-$n$ disposed on-board the vehicle 3. The communication system 1 comprises a master control system 4 and a plurality of slave control systems 5-$n$. The slave control systems 5-$n$ are disposed proximal to the associated vehicle systems 2-$n$.

The vehicle systems 2-$n$ each comprise a local controller 6-$n$ for controlling operation of the vehicle system 2-$n$. As described herein, the local controller 6-$n$ controls the vehicle system 2-$n$ in dependence on a control signal received from the slave control system 5-$n$. The local controller 6-$n$ may, for example, control operation of one or more actuator (not shown) provided in the vehicle system 2-$n$. In the present embodiment, the local controller 6-$n$ comprises a first port P1 for electrical connection to the slave control system 5-$n$. The first port P1 comprises at least one communication channel C(n) for receiving an electrical signal from the slave control system 5-$n$. The first port P1 may also comprise a power supply line PL(n) for supplying electrical power to the slave control system 5-$n$. Alternatively, a separate power supply line may be provided for supplying electrical power to the slave control system 5-$n$. The local controller 6-$n$ may comprise a housing H-n. The slave control system 5-$n$ may be located inside the housing H-n or may be external to the housing H-n, for example mounted to an exterior thereof. In a variant, the slave control system 5-$n$ may be integrated into the local controller 6-$n$. For example, the slave control system 5-$n$ and the local controller 6-$n$ may be integrated on a common electrical circuit board.

The master control system 4 is configured to communicate with each of the slave control systems 5-$n$ and may optionally control the associated vehicle system 2-$n$. The communication between the master control system 4 and the slave control systems 5-$n$ may be one-way communication. For example, the communication may comprise transmission of a control request from the master control system 4 to the slave control system 5-$n$ to control the vehicle system 2-$n$. In the present embodiment, the communication between the master control system 4 and the slave control systems 5-$n$ is two-way communication. For example, the communication may comprise transmission of a status signal from the slave control system 5-$n$ to the master control system 4.

Figure 2:
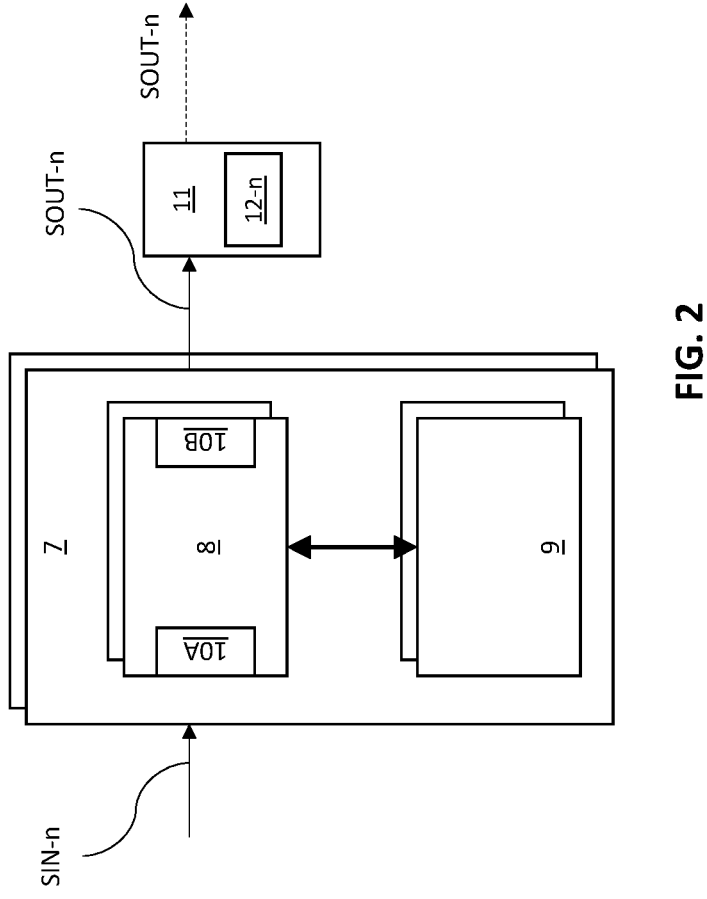
FIG. 2 shows a schematic representation of a master control system for use in the communication system shown in FIG. 1.

As shown in FIG. 2, the master control system 4 comprises a master controller 7 having at least one master processor 8 and a first memory system 9. The master electrical processor 8 is an electronic processor and is configured to implement a set of computational instructions stored in the first system memory 9. When executed, the computational instructions cause the master electrical processor 8 to implement the method(s) described herein. The at least one master electrical processor 8 has at least one electrical input 10A for receiving a first input signal SIN-n; and at least one electrical output 10B for outputting one or more first output signal SOUT-n. The first input signal SIN-n may comprise a request to change the operational configuration of one or more of the vehicle system 2-$n$. The request may be generated in response to a user input or by another on-board controller. Alternatively, or in addition, the first input signal SIN-n may be received from the slave control system 5-$n$, for example in the form of a status signal to indicate a status of the vehicle system 2-$n$. The first output signal SOUT-n may comprise a request to control operation of the vehicle systems 2-$n$. It will be understood that the first output signal SOUT-n may be generated in dependence on the first input signal SIN-n, for example to control the vehicle system 2-$n$ in dependence on a user input.

The master control system 4 comprises (or is electrically connected to) a master transceiver 11. The master transceiver 11 is a wireless transceiver configured to transmit and receive radio frequency (RF) signals. The transmission of wireless signals is represented by dashed lines in FIG. 1; and the transmission of wired signals is represented by solid (continuous) lines in FIG. 1. The master transceiver 11 comprises a transmitter and a receiver. In a variant, the master control system 4 may comprise a transmitter and the receiver may be omitted. The master transceiver 11 is configured to transmit the first output signal SOUT-n as a wireless signal. The first output signal SOUT-n may comprise a polling signal to interrogate each slave control system 5-$n$, for example to request identification of the slave control system 5-$n$ and request a status information or diagnostic information. The first output signal SOUT-n may be transmitted at predetermined time intervals, for example once every 100 milliseconds, 500 milliseconds or once every second. Alternatively, or in addition, the first output signal SOUT-n may be transmitted in dependence on a user input to reduce perceived lay in the system.

In the present embodiment, the master transceiver 11 is an ultra-wideband transceiver configured to transmit a wireless signal over a bandwidth greater than or equal to 500 MHz. The master transceiver 11 comprises at least one antenna 12-$n$ disposed in the vehicle 3. In the present embodiment, the master transceiver 11 comprises a first antenna 12-1 and a second antenna 12-2. The master transceiver 11 may have different operating frequencies for different territories. The master transceiver 11 in the present embodiment operates on up to three channels having operating frequencies of 315 MHz (±17 kHz); and 433.92 MHz (±17 kHz). A LF coil (not shown) may be provided, or optionally a 3D coil. The first and second antennas 12-1, 12-2 are spaced apart from each other to facilitate determining a position of the slave control systems 5-$n$. For example, the time-of-flight of signals to or from the first and second antennas 12-1, 12-2 may be used to trilaterate (true-range multilaterate) the position of the slave control systems 5-$n$. The master control system 4 may differentiate between the slave control systems 5-$n$ in dependence on their relative position on the vehicle 3. As described herein, this may be used during an initial set-up procedure to enable the master control system 4 to identify the slave control system 5-n associated with each vehicle system 2-n.

Figure 3:
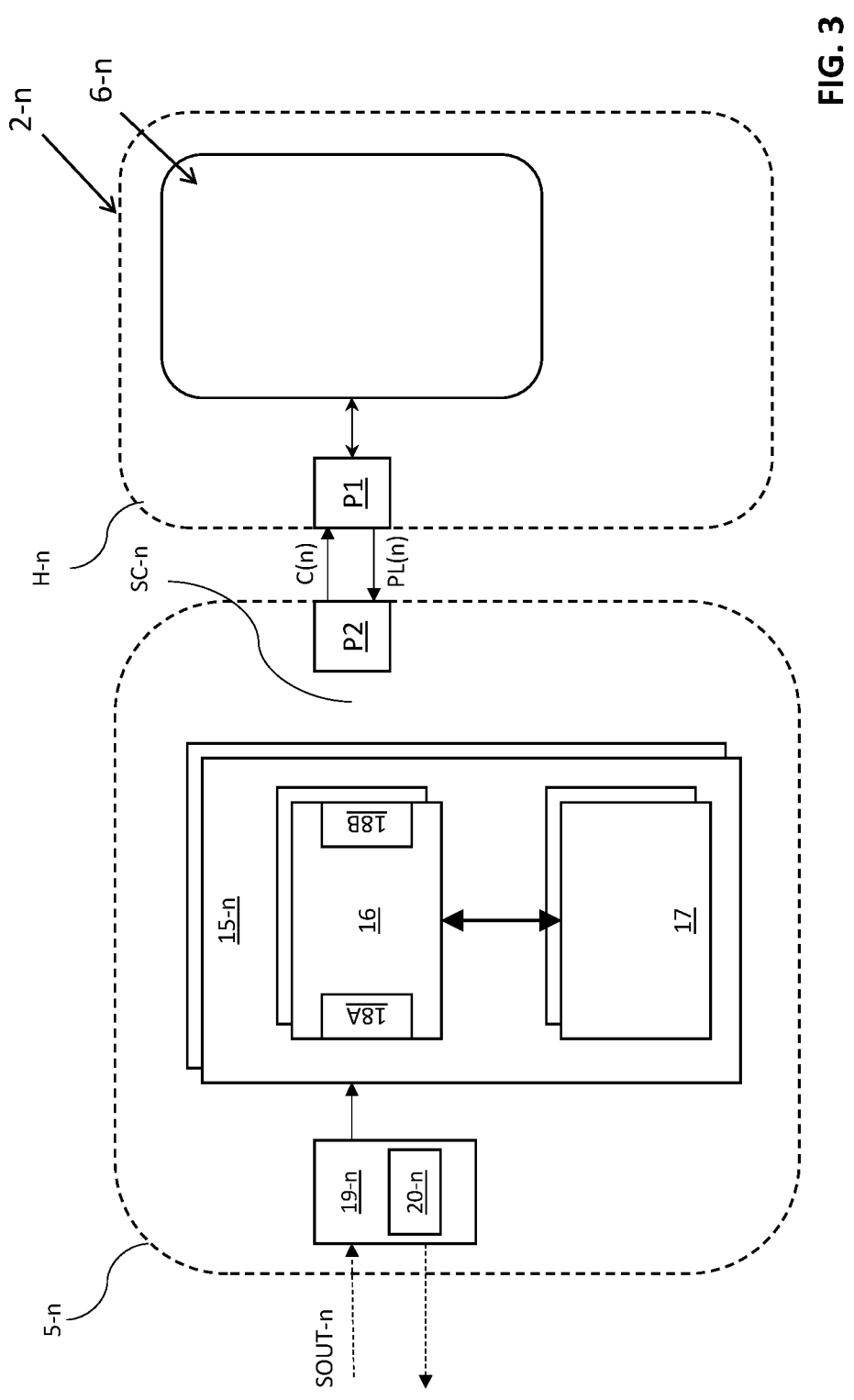
FIG. 3 shows a schematic representation of a slave control system for use in the communication system shown in FIG. 1.

As shown in FIG. 3, the slave control systems 5-n each comprise one or more slave controller 15 for controlling operation of the associated on-board vehicle system 2. The one or more slave controller 15 is configured to receive the first output signal SOUT-n transmitted by the master control system 4. The slave controller 15 comprises at least one slave electrical processor 16 and a second system memory 17. The slave electrical processor 16 is an electronic processor and is configured to implement a set of computational instructions stored in the second system memory 17. A set of computational instructions is stored on the second memory 17. When executed the instructions cause the at least one slave electrical processor 16 to perform the method(s) described herein. The slave electrical processor 16 has an electrical input 18A for receiving the first output signal SOUT-n; and at least one electrical output 18B for outputting one or vehicle system control signal SC-n to the vehicle system 2-n. The slave control system 5-n comprises a second port P2 for connection to the first port P1 of the local controller 6-n. The first and second ports 7, 19 are complementary to enable wired communication via the one or more communication channel C(n). The vehicle system control signal SC-n is output to the vehicle system 2-n by the one or more communication channel C(n). The local controller 6-n is configured to control operation of the vehicle system 2 in dependence on the vehicle system control signal SC-n. As outlined above, the first and second ports 7, 9 provide an electrical connection to supply power to the slave control system 5-n.

The slave control systems 5-n in the present embodiment have like configurations. The slave control system 5-n comprises (or is electrically connected to) a slave transceiver 19-n. The slave transceiver 19-n is a wireless transceiver configured to transmit and receive radio frequency (RF) signals. In the present embodiment, the slave transceiver 19-n is configured to receive the first output signal SOUT-n. The slave transceiver 19-n comprises an antenna 20-n. The first output signal SOUT-n may comprise a polling signal to interrogate each slave control system 5-n. The or each slave control system 5-n may be configured to respond to the polling signal by transmitting an identifier along with status information and/or diagnostic information.

The master control system 4 may differentiate between the slave control systems 5-n in dependence on the determined location of the slave control systems 5-n in the vehicle 3. The master control system 4 associates the slave control systems 5-n with the respective vehicle systems 2-n in dependence on their location in the vehicle 3. This pairing process may be performed automatically, for example during a calibration process or final assembly of the vehicle 3. The slave control systems 5-n may each have a unique identifier which the master control system 4 may use in subsequent communications to identify one or more of the slave control system 5-n. Thus, the master control system 4 may communicate directly with each slave control system 5-n. The automated pairing of the master control system 4 with the slave control systems 5-n may facilitate assembly of the vehicle 3.

The slave control systems 5-n may be configured to control a plurality of different vehicle systems 2-n. The operation of the communication system 1 will now be described with references to first, second and third vehicle systems 2-1, 2-2, 2-3, by way of example. The vehicle systems 2-n described herein comprise a first vehicle system

2-1 comprising an adjustable side mirror 25; a second vehicle system 2-2 comprises a powered (electric) tailgate 26; and a third vehicle system 2-3 comprises a powered (electric) window 27. It will be understood that the vehicle systems 2-n are not limited in this respect. The communication system 1 can be used to communicate with other types of vehicle systems 2-n. For example, the vehicle system 2-n may comprise or consist of a door lock mechanism comprising a latching mechanism; or a handle retraction mechanism for retracting and deploying a door handle. The vehicle systems 2-n may comprise a switch or sensor disposed on the vehicle 3. For example, the vehicle system 2-n may comprise a sensor configured to detect operation of a door handle; or a sensor to detect opening and closing of a vehicle door. Alternatively, or in addition, the vehicle systems 2-n may comprise a powered (electric) sunroof (not shown).

The first vehicle system 2-1 comprises a first mirror actuator 28-1 and a second mirror actuator 28-2 operable to change the orientation of the side mirror 25. The first and second mirror actuators 28-1, 28-2 are electrically connected to the first local controller 6-1. A first slave control system 5-1 is electrically connected to the first local controller 6-1. The first slave control system 5-1 outputs a first vehicle system control signal SC-1 to the first local controller 6-1 in dependence on a first output signal SOUT-1 received from the master control system 4. The first local controller 6-1 controls operation of the first and second mirror actuators 28-1, 28-2 in dependence on the first vehicle system control signal SC-1 received from the first slave control system 5-1. The second vehicle system 2-2 comprises a tailgate actuator 29 operable to open and close the tailgate 26. The second local controller 6-2 is configured to control operation of the tailgate actuator 29. The tailgate actuator 29 is electrically connected to the second local controller 6-2. A second slave control system 5-2 is electrically connected to the second local controller 6-2. The second slave control system 5-2 outputs a second vehicle system control signal SC-2 to the second local controller 6-2 in dependence on a second first output signal SOUT-2 received from the master control system 4. The second local controller 6-2 controls operation of the tailgate actuator 29 in dependence on the second vehicle system control signal SC-2 received from the second slave control system 5-2. The third vehicle system 2-3 comprises a window actuator 30 operable to open and close the powered window 27. The third local controller 6-3 is configured to control operation of the window actuator 30. The window actuator 30 is electrically connected to the third local controller 6-3. A third slave control system 5-3 is electrically connected to the third local controller 6-3. The third slave control system 5-3 outputs a third vehicle system control signal SC-3 to the third local controller 6-3 in dependence on a third first output signal SOUT-3 received from the master control system 4. The third local controller 6-3 controls operation of the window actuator 30 in dependence on the third vehicle system control signal SC-3 received from the third slave control system 5-3.

The first output signal SOUT-n may comprise one of the identifiers to identify a target system to be controlled. This enables directed communication with one of the slave control systems 5-n (or a proper subset of the slave control systems 5-n). This may reduce or avoid unnecessary communication with the other slave control systems 5-n. In the present embodiment, the first slave control system 5-1 has a first identifier; the second slave control system 5-3 has a second identifier; and the third slave control system 5-3 has a third identifier. In the present embodiment, the first output signal SOUT-1 may comprise the first identifier; the second first output signal SOUT-2 may comprise the second identifier; and the third first output signal SOUT-3 may comprise the third identifier.

The master control system 4 is configured to control operation of the vehicle system 2-n in dependence on one or more input to the electrical input 10A. The input may comprise a request signal generated by another vehicle system, for example in dependence on operating conditions of the vehicle 3 and/or ambient conditions. The master control system 4 may, for example, be configured to control operation of the vehicle system 2-n in dependence an input signal SIN-n received from a vehicle controller (denoted generally by the reference numeral 37 in FIG. 1) associated with another vehicle system. Alternatively, or in addition, the input may comprise a request signal generated in dependence on one or more user input. In the present embodiment, the master control system 4 is electrically connected to a human machine interface 35. The human machine interface 35 is configured to detect a user input and to control operation of the vehicle systems 2-n in dependence on the user input. The human machine interface 35 is provided in the vehicle 3, for example in one of the following locations: a centre console, a dashboard, and a steering wheel control panel. Alternatively, or in addition, the human machine interface 35 may be remote from the vehicle 3, for example in a portable device for providing remote control of the vehicle systems 2-n. The portable device may comprise a key fob or a cellular telephone, for example. The human machine interface 35 generates a user request signal in dependence on the user input. The human machine interface 35 comprises one or more input devices 36 for registering the user input. The input devices 36 may, for example, comprise a capacitive sensor or a resistive sensor.

The input devices 36 may be integrated into a touch screen configured to provide a graphical interface. Alternatively, or in addition, the input devices 36 may comprise one or more electromechanical switch or button. The input devices 36 generate a user request signals which are output to the electrical input 10A of the master electrical processor 8. The master electrical processor 8 is configured to generate the first output signals SOUT-n in dependence on the user request signals.

The master control system 4 is operable to transmit the first output signal SOUT-n to control operation of one or more of the vehicle systems 2-n. In the present embodiment, the master control system 4 is operable to transmit first, second and third first output signals SOUT-1, SOUT-2, SOUT-3 to control operation of each of the first, second and third vehicle systems 2-1, 2-2, 2-3. The first output signal SOUT-n comprises a system identifier to identify the vehicle system 2-n (or more than one of the vehicle systems 2-n) to be controlled.

Figure 4:
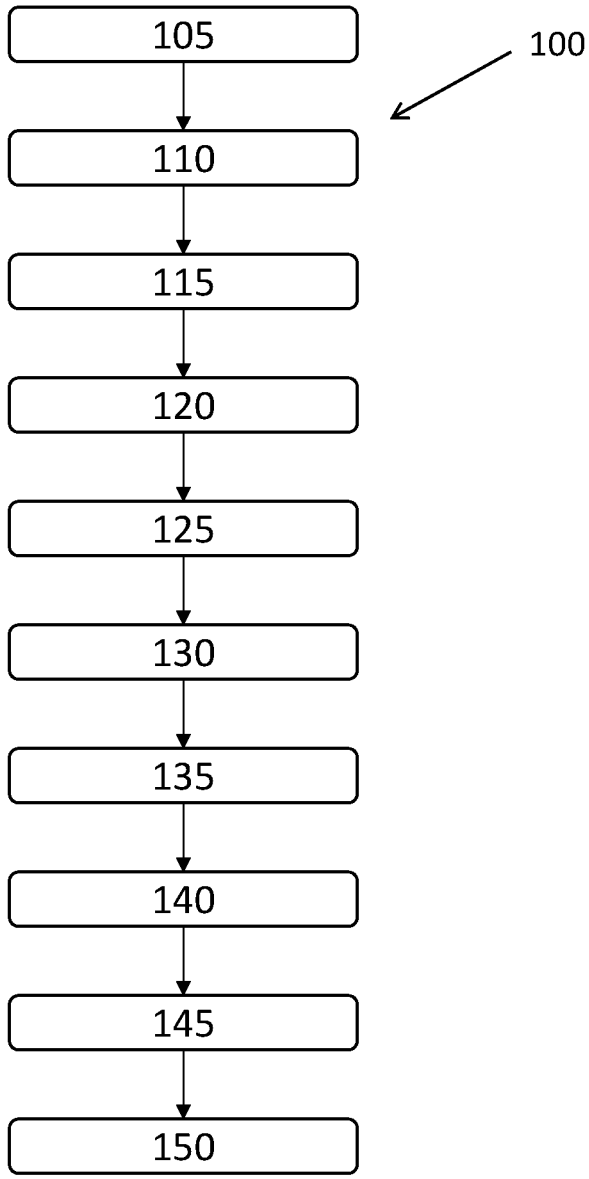
FIG. 4 shows a first block diagram representing operation of the communication system according to an embodiment of the present invention to control one or more vehicle system.

The operation of the communication system 1 will now be described with reference to a first block diagram 100 shown in FIG. 4. The communication system 1 is activated (BLOCK 105). The human machine interface 35 detects a user input and generates a request signal (BLOCK 110). The request signal provides the first input signal SIN-n for the master electrical processor 8 via the electrical input 10A (BLOCK 115). The master electrical processor 8 parses the first input signal SIN-n, for example to identify which one of the plurality of vehicle systems 2-n is to be controlled (BLOCK 120). The master electrical processor 8 generates the first output signal SOUT-n in dependence on the request signal (BLOCK 125). The first output signal SOUT-n includes a system identifier to identify one or more of the vehicle system 2-n to be controlled. The first output signal SOUT-n may optionally also comprise an identifier to identify the one or more of the slave control systems 5-n required to implement the control strategy. The first output signal SOUT-n is output to the master transceiver 11 for transmission as a wireless signal to the slave control systems 5-n (BLOCK 130). The one or more slave control system 5-n receive the first output signal SOUT-n (BLOCK 135). The one or more slave control system 5-n generate a vehicle system control signal SC-n which is output to the local controller 6-n associated with the vehicle system 2-n (BLOCK 140). The local controller 6-n controls the vehicle system 2-n to implement the requested control strategy (BLOCK 145). The communication system 1 continues to control operation of the vehicle systems 2-n in dependence on the request signals. The communication system 1 is deactivated (BLOCK 150).

Figure 5:
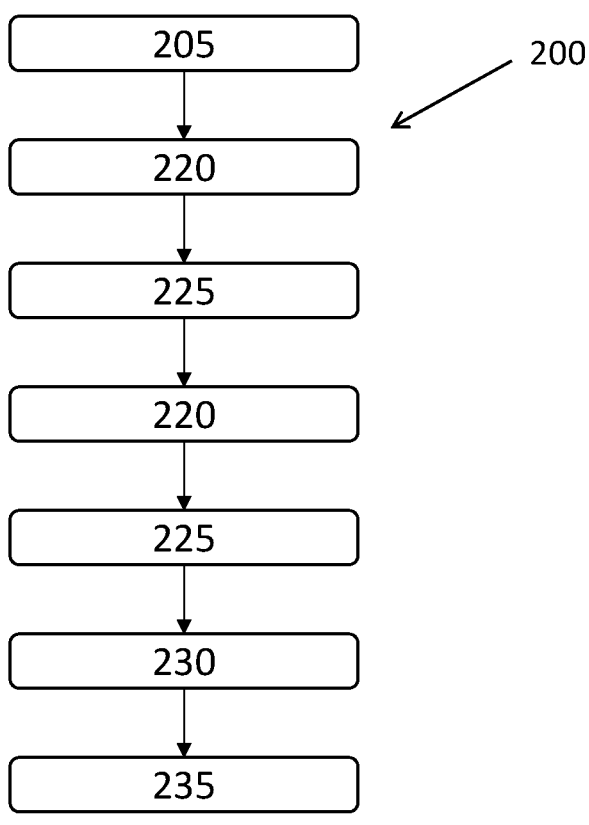
FIG. 5 shows a second block diagram representing operation of the communication system according to a further embodiment of the present invention to identify and characterise the one or more slave control system in dependence on a position in the vehicle.

The operation of the communication system 1 to identify the slave control systems 2-n in dependence on their location on the vehicle 3 will now be described with reference to a second block diagram 200 shown in FIG. 5. This process may be performed during an initial set-up procedure, for example during assembly of the vehicle 3. The communication system 1 is activated and electrical power is supplied to the master control system 4 and the or each slave control systems 5-n (BLOCK 205). The master control system 4 transmits a first output signal SOUT-n to the or each slave control system 5-n (BLOCK 210). The or each slave control system 5-n responds to the first output signal SOUT-n by transmitting an identification signal to the master control system 4 (BLOCK 215). The identification signal comprises an identifier, such as a unique identification code, for identifying the slave control system 5-n. The master control system 4 measures a time-of-flight of one or more wireless signals between the master transceiver 11 and the slave transceiver 19-n. (BLOCK 220). First and second time-of-flights may be measured for the first and second antennas respectively. The master control system 4 utilises the time-of-flight of the signals to determine the location of the slave control system 5-n on the vehicle 3 (BLOCK 225). The master control system 4 associates the or each slave control system 5-n with a vehicle system 2-n in dependence on the determined location (BLOCK 230). The master control system 4 may, for example, compare the determined location of the or each slave control system 5-n with a predefined position data. The determined associations between the or each slave control system 5-n and the vehicle system 2-n is stored in memory (BLOCK 235). The one or more vehicle system 2-n may subsequently be controlled in dependence on the determined associations.

The communication system 1 according to the present embodiment provides two-way intra-vehicle communication between the master control system 4 and the or each slave control system 5-n. A suitable communication protocol, either serial or parallel, implemented to manage the communication between the master control system 4 and the or each slave control system 5-n. The master control system 4 may receive signals from the slave control systems 5-n. For example, the slave control systems 5-n may transmit status data, diagnostic data or fault data to the master control system 4. The slave control system 5-n may also transmit a control signal to the master control system 4. For example, the vehicle system 2-n may comprise or consist of a human machine interface for receiving user inputs. The human machine interface may, for example, comprise a control panel or input device for receiving the user input. By way of example, the human machine interface may provide one or more of the following functions: controlling locking and unlocking of a door; controlling opening of a powered window; controlling an infotainment system; controlling a heating, ventilation and air condition (HVAC) system. The slave control system 5-*n* may transmit the first input signal to the master control system 4. The master control system 5 may generate the control signal to control the vehicle system 2-*n*. The control signal may be transmitted to the source slave control system 5-*n* that generated the original request; or may be transmitted to another slave control system 5-*n*.

In a variant, the communication system 1 may provide one-way communication from the master control system 4 to the or each slave control system 5-*n*. The master transceiver 11 may be replaced with a transmitter in this arrangement. The transmission of the first output signal SOUT-n to the slave control system 5-*n* would be unchanged in this arrangement.

A plurality of the slave control systems 5-*n* in the vehicle 3 may have like configurations. The slave control systems 5-*n* may have a universal configuration to enable connection to two or more different local controllers 6-*n* in the vehicle 3. The slave control systems 5-*n* may have a common design, for example to allow the same slave control system 5-*n* to be used in different applications. This may enable like slave control system 5-*n* to be used to control different vehicle systems 2-*n*. The slave control systems 5-*n* could be interchangeable. The vehicle 3 may comprise a plurality of vehicle systems 2-*n* each having at least one local controller 6-*n*. The first ports P1 provided on the local controllers 6-*n* may have the same configuration to enable connection of the same slave control systems 5-*n* (having a cooperating second port P2) to different local controllers 6-*n*. A plurality of the local controllers 6-*n* in the vehicle 3 may have like configurations.

It will be appreciated that various changes and modifications can be made to the present invention without departing from the scope of the present application.

The invention claimed is:

1. A communication system for intra-vehicle communication in a host vehicle, the communication system comprising:
  a master control system comprising one or more master controller and a master transceiver, the master control system being configured to receive a first input signal to control a first on-board vehicle system; and
  a first slave control system associated with the first on-board vehicle system and positioned on the host vehicle, the first slave control system comprising one or more first slave controller and a first slave transceiver;
  the master transceiver and the first slave transceiver being configured to establish wireless communication between the master control system and the first slave control system, wherein both the master transceiver and the first slave transceiver are ultra-wideband transceivers;
  wherein, in use, the master control system is configured to receive the first input signal and to generate a first output signal based at least in part on the first input signal; and to transmit the first output signal to the first slave control system to control operation of the first on-board vehicle system.

2. The communication system as claimed in claim 1, wherein the one or more master controller comprises:
  at least one master electrical processor having an electrical input for receiving the first input signal; and
  at least one memory device electrically coupled to the at least one master electrical processor and having instructions stored therein;

wherein the at least one master electrical processor is configured to access the at least one memory device and execute the instructions therein so as to generate the first output signal for transmission to the first slave control system; and
  wherein the one or more first slave controller comprises:
    at least one second slave electrical processor having an electrical input for receiving the first output signal; and
    at least one memory device electrically coupled to the at least one second slave electrical processor and having instructions stored therein;
    wherein the at least one second slave electrical processor is configured to access the at least one memory device and execute the instructions therein so as to generate a vehicle system control signal to control operation of the first slave control system.

3. The communication system as claimed in claim 1, wherein the master control system is configured to receive the first input signal from a human machine interface or a vehicle controller.

4. The communication system as claimed in claim 1, wherein the first output signal comprises a first identifier for identifying the first slave control system.

5. The communication system as claimed in claim 1, further comprising a second slave control system associated with a second on-board vehicle system, the second slave control system being configured to control operation of the second on-board vehicle system; the second slave control system comprising one or more second slave controller and a second slave transceiver;
  wherein, in use, the master control system is configured to receive a second input signal and to generate a second output signal based at least in part on the second input signal; and to transmit the second output signal to the second slave control system to control operation of the second on-board vehicle system.

6. The communication system as claimed in claim 5, wherein the first slave transceiver and the second slave transceiver are configured to establish wireless communication between the first slave control system and the second slave control system.

7. The communication system as claimed in claim 5, wherein the second slave control system comprises a second identifier for identifying the second slave control system.

8. The communication system as claimed in claim 7, wherein the second output signal comprises the second identifier to identify the second slave control system.

9. The communication system as claimed in claim 5, wherein the master transceiver and the second slave transceiver are configured to establish wireless communication between the master control system and the second slave control system.

10. The communication system as claimed in claim 1, wherein the master control system is configured to receive a second input signal to control the second on-board vehicle system.

11. The communication system as claimed in claim 1, wherein the master transceiver comprises an ultra-wideband transceiver.

12. The communication system as claimed in claim 11, wherein the ultra-wideband transceiver is configured to operate over a bandwidth greater than or equal to 500 MHz.

13. A vehicle comprising the communication system as claimed in claim 1.

14. The communication system as claimed in claim 1, wherein the master control system is further configured to determine a location of the first slave control system, and wherein determining the location of the first slave control system includes measuring a time-of-flight of one or more signals between the master transceiver and the first slave transceiver.

15. A method of performing intra-vehicle communication between a master control system and at least a first slave control system disposed in a host vehicle, the method comprising:

the master control system receiving a first input signal comprising a request to control a first on-board vehicle system;

the master control system generating a first output signal based at least in part on the first input signal;

transmitting the first output signal from the master control system to a first slave control system as a wireless signal;

the first slave control system controlling operation of the first on-board vehicle system based at least in part on the first output signal, wherein the master control system comprises a master transceiver and the first slave control system comprises a first slave transceiver, and wherein both the master transceiver and the first slave transceiver are ultra-wideband transceivers.

16. A non-transitory computer-readable storage medium having a set of instructions stored therein which, when executed, cause a processor to perform the method claimed in claim 15.

* * * * *